United States Patent
Yang et al.

(10) Patent No.: US 8,599,769 B2
(45) Date of Patent: Dec. 3, 2013

(54) UPLINK OPEN LOOP POWER CONTROL SYSTEM

(75) Inventors: Rongzhen Yang, Shanghai (CN); Wei Guan, Shanghai (CN); Apostolos Papathanassiou, San Jose, CA (US); Hujun Yin, Saratoga, CA (US); Yang-Seok Choi, Portland, OR (US); Yi Hsuan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 643 days.

(21) Appl. No.: 12/638,707

(22) Filed: Dec. 15, 2009

(65) Prior Publication Data

US 2011/0002279 A1    Jan. 6, 2011

Related U.S. Application Data

(60) Provisional application No. 61/223,360, filed on Jul. 6, 2009.

(51) Int. Cl.
  *H04W 4/00* (2009.01)
(52) U.S. Cl.
  USPC ............ 370/329; 370/252; 455/522
(58) Field of Classification Search
  USPC ........... 370/318–327, 335–338; 455/522–527
  See application file for complete search history.

(56) References Cited

U.S. PATENT DOCUMENTS

| 7,813,753 B2 * | 10/2010 | Santhanam | 455/522 |
| 2011/0103241 A1 * | 5/2011 | Cho et al. | 370/252 |
| 2011/0117953 A1 * | 5/2011 | Kim et al. | 455/522 |

FOREIGN PATENT DOCUMENTS

| WO | WO2009078576 | * | 6/2009 |
| WO | WO 2009078576 A1 | * | 6/2009 |

OTHER PUBLICATIONS

"IEEE Standard for Local and metropolitan area networks, Part 16: Air Interface for Broadband Wireless Access Systems," IEEE Computer Society and the IEEE Microwave Theory and Techniques Society, IEEE Std 802.16 2009, May 29, 2009, New York, New York.

* cited by examiner

*Primary Examiner* — Ricky Ngo
*Assistant Examiner* — Iqbal Zaidi
(74) *Attorney, Agent, or Firm* — Schwabe, Williamson & Wyatt, P.C.

(57) ABSTRACT

Embodiments of the present invention provide an uplink open loop power control system in which interference over thermal information is transmitted to mobile stations. Other embodiments may be described and claimed.

15 Claims, 7 Drawing Sheets

UPLINK OPEN LOOP POWER CONTROL SYSTEM

CROSS REFERENCE TO RELATED APPLICATIONS

The present application claims priority to U.S. Patent Application No. 61/223,360, filed Jul. 6, 2009, entitled "Advanced Wireless Communication Systems and Techniques," the entire specification of which is hereby incorporated by reference in its entirety for all purposes, except for those sections, if any, that are inconsistent with this specification.

FIELD

Embodiments of the present disclosure relate to the field of wireless access networks, and more particularly, to an uplink open loop power control system in said wireless access networks.

BACKGROUND

Orthogonal frequency division multiple access (OFDMA) communications use an orthogonal frequency-division multiplexing (OFDM) digital modulation scheme to deliver information across broadband networks. OFDMA systems may access the broadband network through a multiple-input multiple-output (MIMO) interface. Uplink power control is an important component of a MIMO OFDMA/OFDM system as it relates to a balance of link performance and terminal battery power as well as to reducing the inter-base station uplink co-channel interference.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A and/or B" means "(A), (B), or (A and B)." For the purposes of the present invention, the phrase "A, B, and/or C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present disclosure describe uplink open loop transmit power control systems and methods. Uplink open loop transmit power control, or simply open loop power control (OLPC), as used herein, may refer to a determination, made by a mobile station, as to a transmit power to use for uplink transmissions to a base station. While these transmit power determinations may be based on feedback from a base station, or even an initial transmit power level provided by the base station, the transmit power is adjusted by the mobile station independent of controls by the base station. Such OLPC systems increase flexibility and reduce control signaling overhead in the communication networks in which they are utilized.

OLPC systems and methods provided by this disclosure may be applicable to OFDMA communications as used by multicarrier transmission schemes presented in, e.g., the Institute of Electrical and Electronics Engineers (IEEE) 802.16-2009, approved May 13, 2009, along with any amendments, updates, and/or revisions (e.g., 802.16m, which is presently at predraft stage), $3^{rd}$ Generation Partnership Project (3GPP) long-term evolution (LTE) project, ultra mobile broadband (UMB) project (also referred to as "3GPP2"), etc. In other embodiments, communications may be compatible with additional/alternative communication standards and/or specifications.

Figure 1:
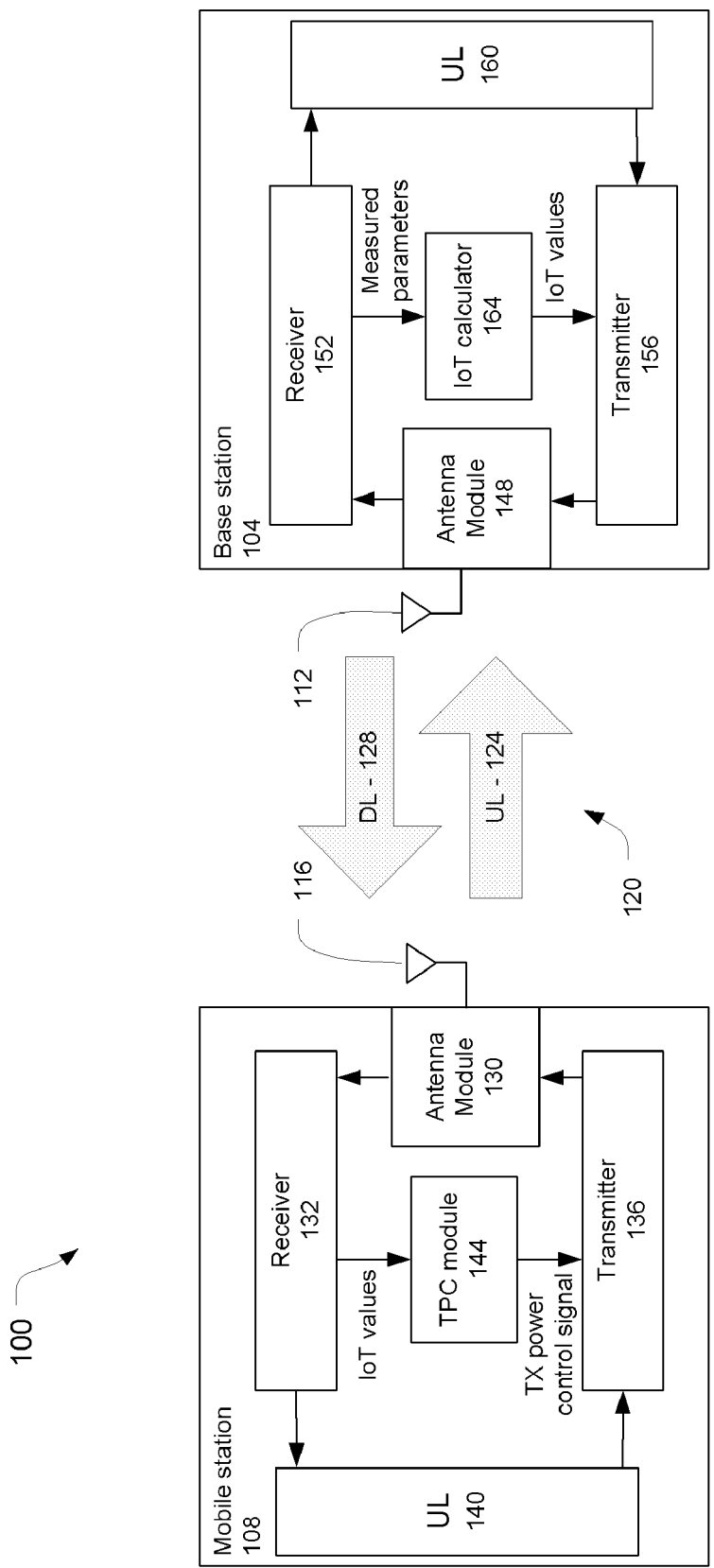
FIG. 1 illustrates a wireless communication environment in accordance with embodiments of this disclosure.

FIG. 1 illustrates a wireless communication environment 100 in accordance with an embodiment of this disclosure. In this embodiment, the wireless communication environment 100 is shown with two wireless communication devices, e.g., base station 104 and mobile station 108, which use respective antenna structures 112 and 116 to wirelessly communicate with one another via an over-the-air (OTA) interface 120. A communication over the OTA interface 120 may include a wireless uplink transmission 124 (or simply "uplink 124") that is directed from the mobile station 108 to the base station 104 and a wireless downlink transmission 128 (or simply "downlink 128") that is directed from the base station 104 to the mobile station 108. Each of the antenna structures 112 and 116 may have one or more antennae. An antenna may be a directional or an omnidirectional antenna, including, e.g., a dipole antenna, a monopole antenna, a patch antenna, a loop antenna, a microstrip antenna or any other type of antenna suitable for transmission/reception of radio frequency (RF) signals.

The mobile station 108 and the base station 104 may be any type of wireless communication devices that are capable of communicating over the OTA interface 120. In various embodiments the mobile station 108 may include a wireless electronic device such as a desktop computer, a laptop computer, a handheld computer, a tablet computer, a cellular telephone, a pager, an audio and/or video player (e.g., an MP3 player or a digital versatile disk (DVD) player), a gaming device, a video camera, a digital camera, a navigation device (e.g., a global positioning system (GPS) device), a wireless peripheral (e.g., a printer, a scanner, a headset, a keyboard, a mouse, etc.), a medical device (e.g., a heart rate monitor, a blood pressure monitor, etc.), a set-top box, and/or other suitable relatively stationary, portable, or mobile electronic devices. In various embodiments the base station 104 may include a wireless electronic device such as an access point, a base transceiver station, a radio base station, a node B, etc.

The base station 104 and mobile station 108 may use OFDM modulation to transmit large amounts of digital data by splitting a radio frequency signal into multiple small subsignals, which in turn, are transmitted simultaneously at different frequencies. The wireless network devices may operate in accordance with the 802.16 family of standards, discussed above, to implement a fixed, a portable, and/or a mobile broadband wireless access (BWA) networks. In other embodiments, communication between the wireless network devices may be compatible with additional/alternative specifications and/or standards.

The mobile station 108 may include an antenna module 130 configured to couple a receiver 132 and a transmitter 136 with the antenna structure 116. In some embodiments, the antenna module 130 may include a switch to selectively couple the receiver 132 or the transmitter 136 to one or more shared antennae of the antenna structure 116.

The receiver 132 may include a number of physical (PHY) layer and/or media access control (MAC) layer blocks that operate to decode multicarrier transmissions, e.g., OFDMA symbols transmitted across multiple subcarriers, received via the OTA interface 120 to retrieve information. The information retrieved from these multicarrier transmissions may be coupled with upper layers (UL) 140 and/or a transmit power control (TPC) module 144.

The transmitter 136 may also include a number of PHY/MAC layer blocks that operate to receive and encode information from the upper layers 140 into multicarrier transmissions. These multicarrier transmissions may be provided to the antenna module 130 and coupled with the antenna structure 116 for transmission via the OTA interface 120.

In addition to being coupled with the receiver 132, the TPC module 144 may also be coupled with the transmitter 136. The TPC module 144 may be configured to receive information that conveys interference over thermal noise (IoT) power levels, associated with the OTA interface 120, from the receiver 132. The TPC module 144 may also be configured to provide one or more transmit power control signals to one or more blocks of the transmitter 136 in order to control uplink transmit power based on the IoT levels.

A subframe of the uplink 124 may be divided into a number of frequency partitions (FPs) (e.g., four in 802.16m), with each FP including a set of physical resource units (PRUs) across the total number of OFDMA symbols available in the subframe. Each FP can include contiguous (e.g., adjacent) and/or non-contiguous (e.g., distributed) PRUs (DRUs) and may be used for different purposes, e.g., fractional frequency reuse (FFR) or multicast and broadcast services (MBS). The uplink 124 may further include a sounding region that the mobile station 108 may use to transmit a sounding signal to the base station 104 to assist the base station in determining a precoding matrix to use for single or multiple user MIMO communications. In some embodiments, the mobile station 108 may receive a separate IoT power level for each transmission region. A transmission region (or simply "region"), as used herein, may refer to an FP or the sounding region. Information on these region-specific IoT power levels may be transmitted to the mobile station 108 in the same or different messages. The TPC module 144 may then provide region-specific transmit power control signals based on the region-specific IoT power levels.

The base station 104, similar to the mobile station 108, may have an antenna module 148, a receiver 152, a transmitter 156, and upper layers 160 coupled with one another as shown and configured to operate similar to like-named elements in the mobile station 108. The base station 104 may also include an IoT calculator 164 coupled with the receiver 152 and the transmitter 156. The IoT calculator 164 may receive parameters, which may be measured parameters or predetermined, design parameters, and calculate an average IoT power level associated with each region based on the received parameters. The parameters may include white noise power and total interference power summation over the subcarriers and symbols of a given frequency partition for a given period, e.g., for a frame or a subframe. In some embodiments, an average IoT power level may be calculated by the following equation:

$$IoT_{Avg} = \frac{1}{N_{sym} \cdot N} \sum_{n=1}^{N} \sum_{l=1}^{N_{sym}} \frac{i_{n,l} + w_{n,l}}{w_{n,l}}, \quad \text{Equation 1}$$

where $i_{n,l}$ is a total interference power summation at $n^{th}$ subcarrier and $l^{th}$ symbol; $w_{n,j}$ is white noise power; N is a number of subcarriers for a given region; and $N_{sym}$ is a number of OFDMA symbols for a data transmission.

Information pertaining to these calculated IoT power levels may then be provided to the transmitter 156 for transmission to various mobile stations including, e.g., mobile station 108.

Figure 2:
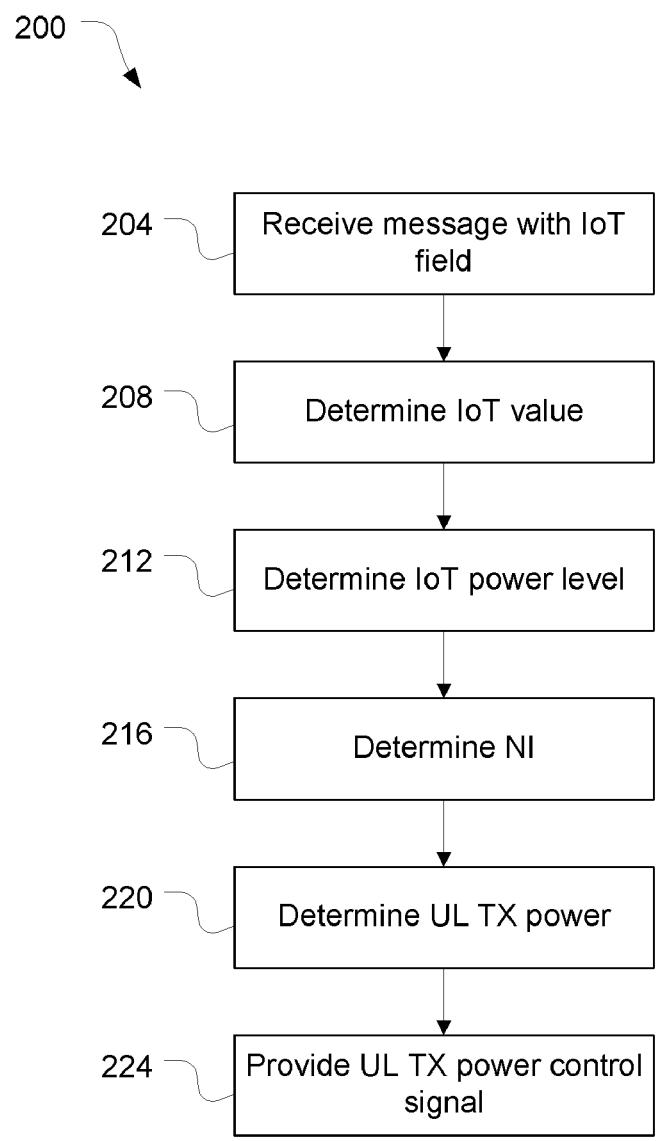
FIG. 2 is a flowchart depicting operations of a mobile station in accordance with some embodiments.

Operation of the mobile station 108 may be described in accordance with some embodiments with respect to the flowchart 200 of FIG. 2. At block 204 ("Receive message with IoT field"), the process may begin with the receipt of a message with an IoT field. In some embodiments, the message may be a power control message that is transmitted in a broadcast MAC connection. Such a message may also be referred to as a broadcast MAC control message. In such embodiments, the TPC module 144 and the IoT calculator 164 may reside in MAC layers of mobile station 108 and base station 104, respectively. In other embodiments, the message may be broadcast in a secondary-superframe header (S-SFH) transmitted at a fixed time interval, e.g., 160 milliseconds (ms), 320 ms, etc.

At block 208 ("Determine IoT value"), the TPC module 144 may determine an IoT value. The message received at block 204 may include one or more IoT fields, with each IoT field having one or more bits that represent a value that corresponds to a particular region. In some embodiments, the IoT field may accommodate seven bits that represent an integer value between 0 and 127.

At block 212 ("Determine IoT power level"), the TPC module 144 may determine an IoT power level corresponding to each IoT value determined at block 208. An IoT value that is an integer value between 0 and 127 may correspond to an IoT power level between 0 decibels (dB) and 63.5 dB in 0.5 dB increments.

In some embodiments, in addition to the seven bits used to communicate the IoT value, the message may include one or more bits to convey a type value indicative of the transmission region to which the IoT value is associated. For example, the power control message could also include a three-bit field that is set to one of five values, with each of the five values corresponding to one of the five transmission regions. In other embodiments, the location of the bits used to communicate the IoT value within the downlink 128 may be used to determine the region to which the IoT value is associated. For example, a broadcast MAC control message may be transmitted in accordance with an abstract syntax notation one format. In this example, the TPC module 144 may reference a bit map to determine to which transmission region a particular IoT value is associated.

At block 216 ("Determine NI"), the TPC module 144 may determine a noise and interference (NI) power level based on each IoT power level determined in block 212. The relationship between the IoT power level and the NI power level may be given by:

$$NI = P_N + IoT + 10 \log_{10}(\Delta f), \quad \text{Equation 2}$$

where $P_N$ is thermal noise power density in 0° Celsius and $\Delta f$ is a subcarrier spacing. The NI power level may be an estimated average power level of the noise and interference per a subcarrier at the base station 104, not including a receive antenna gain at the base station 104. The NI power level may be expressed as an absolute power ratio in decibels referenced to one milliwatt (dBM).

At block 220 ("Determine UL TX power"), the TPC module 144 may determine a desired UL transmit power level based on the NI power level by:

$$P(dBm) = L + SINR_{Target} + NI + \text{Offset\_MS}_{perMS} + \text{Offset\_BS}_{perMS}, \quad \text{Equation 3}$$

where P(dBm) is the transmit power level in dBm per subcarrier per stream for a current transmission; L is an estimated average current UL propagation loss, which includes the transmit antenna gain of the mobile station 108 and path loss; $SINR_{Target}$ is a target uplink signal to interference and noise ratio (SINR) received by the base station 104; Offset_$MS_{perMS}$ is a correction term for power offset specific to the mobile station 108, which is controlled by the mobile station 108 and having an initial value set to zero; and Offset_$BS_{perMS}$ is a correction term for power offset specific to the mobile station 108, which is controlled by the base station 104 through power control messages sent to the mobile station 108.

The $SINR_{Target}$ may be calculated by the TPC module 144 as follows:

$$SINR_{Target} = \log 10\left(\max\left(10^{\wedge}\left(\frac{SINR_{MIN}(dB)}{10}\right), \gamma_{IoT} \times SINR_{DL} - \alpha\right)\right) - \beta \times 10\log 10(TNS), \quad \text{Equation 4}$$

$$N - 10\log 10(R$$

where the top expression corresponds to OLPC Mode 1 and the bottom expression corresponds to OLPC Mode 2, $SINR_{MIN}$ is a minimum SINR rate expected by the base station 104 (this may be set by a unicast power control message sent to the mobile station 108); $\gamma_{IoT}$ is a fairness and IoT control factor that may be broadcast by the base station 104; $SINR_{DL}$ is a ratio of the downlink signal to interference power as measured by the mobile station 108; $\alpha$ is a factor according to a number of receive antennae at the base station 104 (this may be sent by a power control message); $\beta$ is set to zero or one by a bit of a MAC power control mode signaling; TNS is a total number of streams in a logical resource unit (LRU) as indicated by a UL A-MAP information element; C/N is the normalized carrier to noise ratio of a modulation/forward error correction (FEC) rate for a current transmission; and R is a coding rate (e.g., ½, ⅔, ¾, ⅞, or 1).

The OLPC mode that is used to calculate the $SINR_{Target}$ value may be signaled through a power control message. In general, OLPC mode 1 may be used in a manner to provide the base station 104 with more control over the OLPC to provide central management of the tradeoff between overall system throughput and cell edge performance. In OLPC mode 2, more of the decision making authority may be delegated to the mobile station 108, which results in less control signaling occurring between the mobile station 108 and the base station 104.

At block 224 ("Provide UL TX power control signal"), the TPC module 144 may provide an UL transmit power control signal to the transmitter 136 to effectuate a subsequent transmission of multicarrier signals at the UL transmit power determined at block 220. A desired UL transmit power may be determined separately for each transmission region based on the separate IoT levels. In some embodiments, the power control signals may be provided to the transmitter 136 as region-specific power coefficients. For example, the TPC module 144 may determine one or more power coefficients for FP1, one or more power coefficients for FP2, etc.

Receiving IoT information and determining the absolute power density NI at the mobile station 108, rather than receiving the absolute power density NI directly from the base station 104, will lower the control signaling overhead. This is due to the NI range of −150 dBm to −22.5 dBm with 0.5 dBm increments being much larger than the IoT range of 0 to 63.5 dB with 0.5 dB increments, discussed above.

Figure 3:
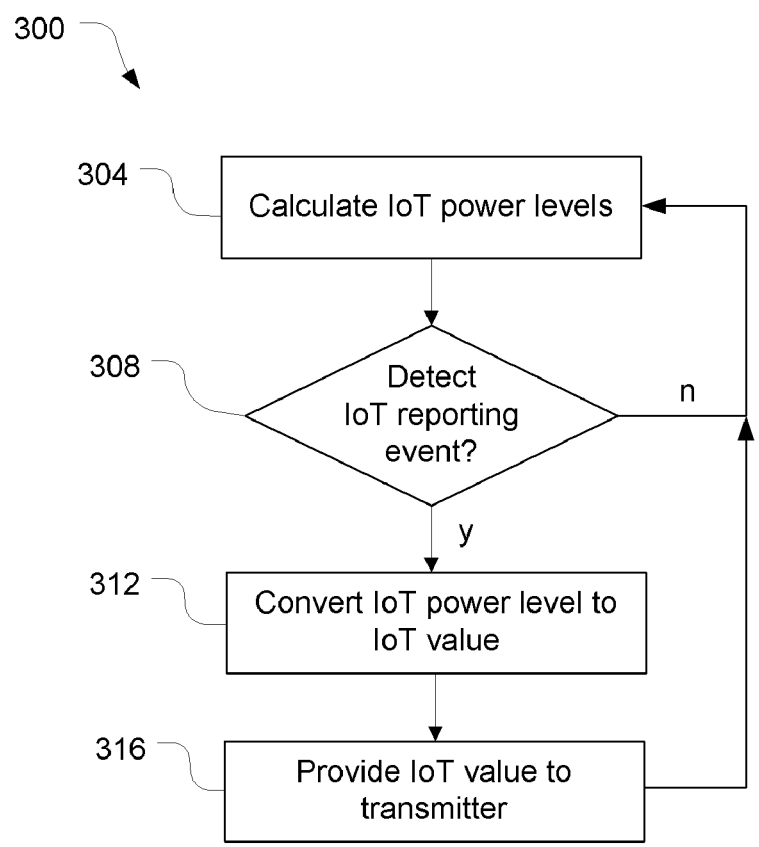
FIG. 3 is a flowchart depicting operations of a base station in accordance with some embodiments.

FIG. 3 is a flowchart 300 depicting operations of the base station 108 in accordance with some embodiments. At block 304 ("Calculate IoT power levels"), the IoT calculator 164 may calculate IoT power levels of one or more transmission regions. The IoT power levels may be calculated as described above with respect to Equation 1.

At block 308 ("Detect IoT reporting event"), the IoT calculator 164 may detect an IoT reporting event for one or more of the transmission regions. In various embodiments, such a detected reporting event may be an occurrence of a network entry event, occurrence of a predetermined event (e.g., a number of intervening frames or subframes being sent), a change in the conditions of a particular transmission region, etc. A detected reporting event may be applicable to all of the transmission regions or a subset of the transmission regions (including just one transmission region). In some embodiments, the base station 104 may employ more than one type of reporting event. For example, the IoT calculator 164 may detect a first reporting event as a network entry event and, thereafter, transmit IoT information every given number of transmitted frames. In some embodiments, reporting of an IoT power level for each transmission region may be equally weighted resulting in a sequential transmission of the IoT power levels for each of the transmission regions. In other embodiments, a magnitude of a change of an IoT power level, from a previously reported IoT power level, may influence the reporting order. For example, the transmission region having the greatest change in IoT power level from the last-reported IoT power level, may be reported first.

At block 312 ("Convert IoT power level to IoT value"), in response to a detection of the IoT reporting event at block 308, the IoT calculator 164 may convert an IoT power level calculated at block 304 to an IoT value that is suitable for transmission in an IoT field of a power control message. As discussed above, the IoT value may be an integer value between 0 and 127. At block 316 ("Provide IoT value to transmitter"), the IoT calculator 164 may provide the IoT value to the transmitter 156 to be incorporated into the, e.g., seven-bit IoT field of the power control message and may control the transmitter 156 to broadcast the power control message to the mobile stations served by the base station 104, e.g., to mobile station 108.

Figure 4:
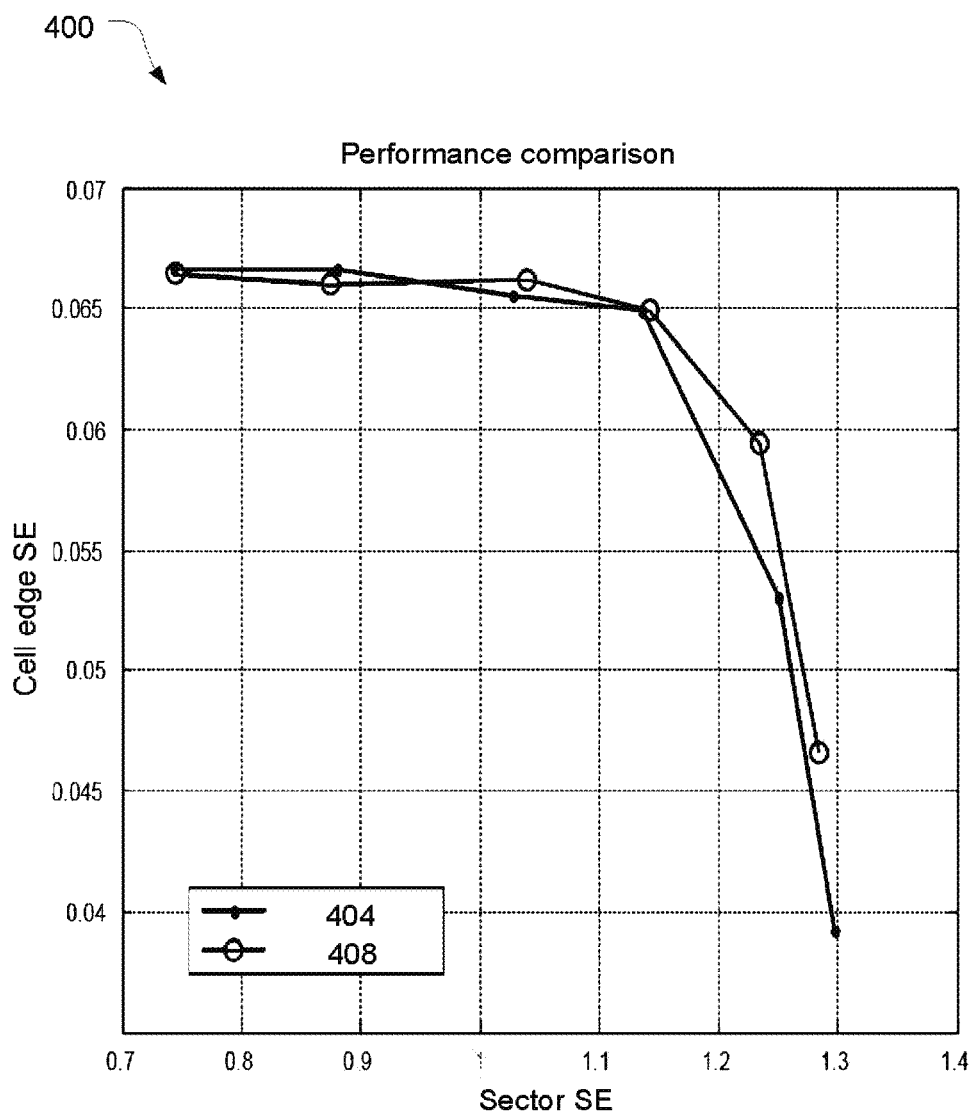
FIG. 4 is a graph illustrating a comparison of throughput performance for a first channel type in accordance with some embodiments.
Figure 5:
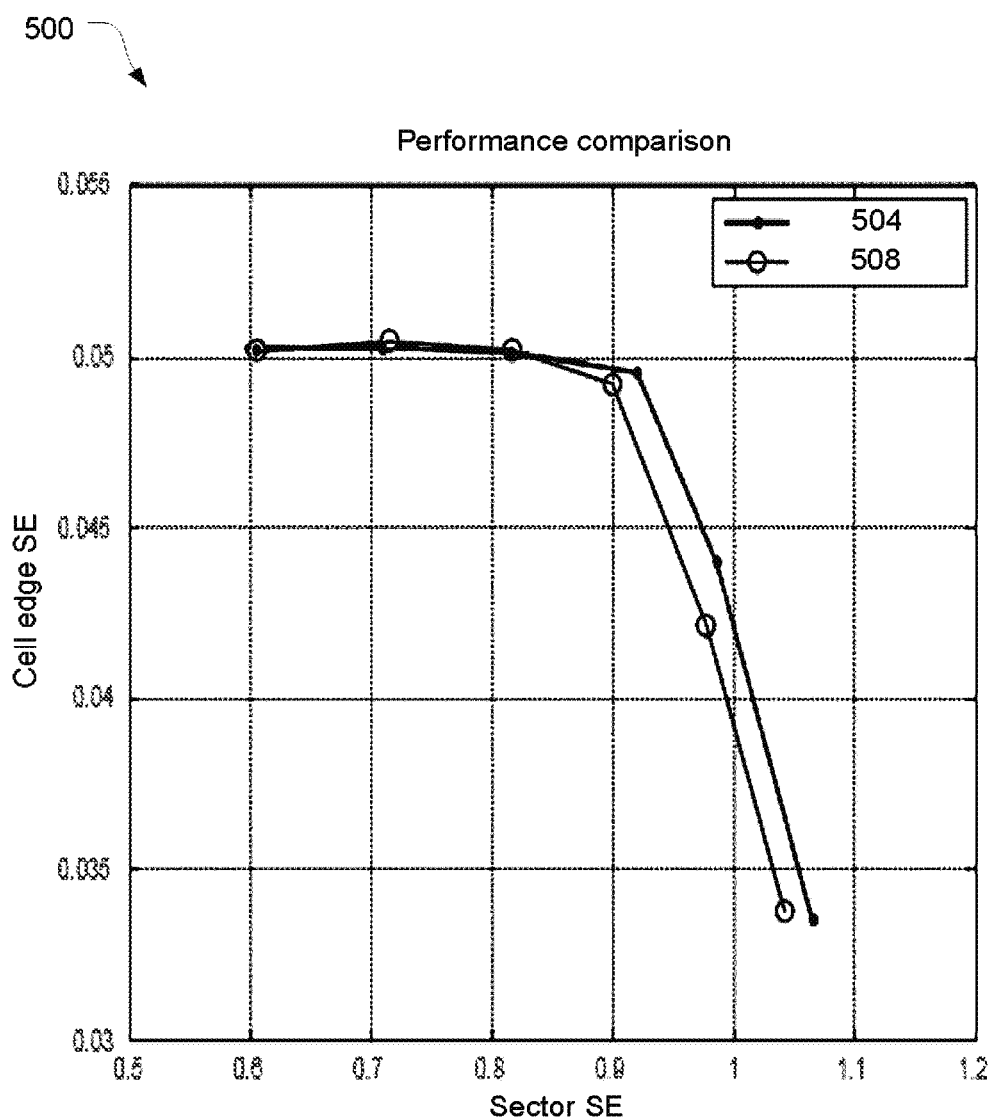
FIG. 5 is a graph illustrating a comparison of throughput performance for a second channel type in accordance with some embodiments.
Figure 6:
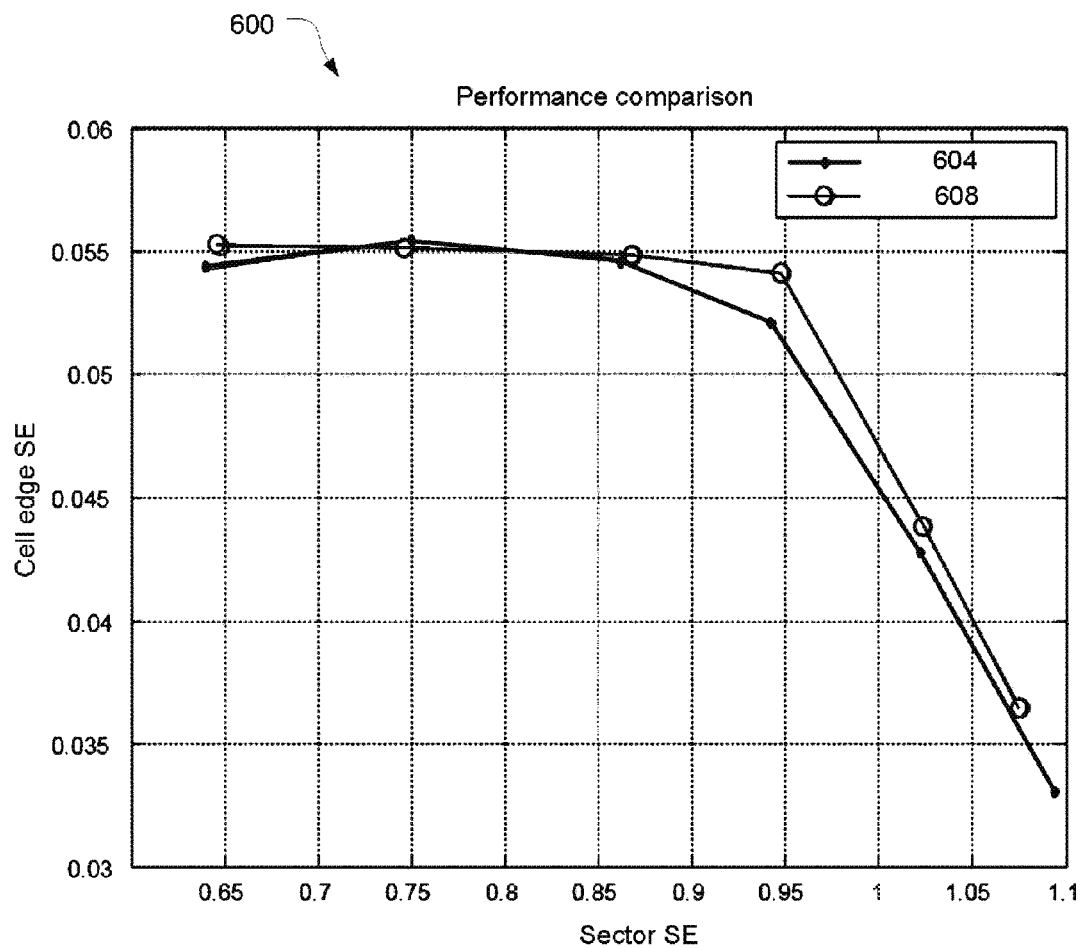
FIG. 6 is a graph illustrating a comparison of throughput performance for a third channel type in accordance with some embodiments.

Providing the IoT value in the power control broadcast message provides the base station 104 with significant flexibility as to when the IoT values are to be reported. FIGS. 4-6 illustrate results of analyses performed with respect to several different reporting periods. The operational parameters that are used in these analyses are provided by the following table.

TABLE 1

| Parameter | Value |
| --- | --- |
| Carrier frequency | 2.5 Gigahertz |
| System bandwidth | 10 Megahertz |
| Reuse factor | 1 |
| Frame duration (Preamble + DL + UL) | 5 milliseconds |
| Number of OFDM symbols in UL frame | 18 |
| FFT size (tone) | 1024 |
| Useful tone | 864 |
| Number of LRUs | 48 |
| LRU type | DRU |
| Number of users per sector | 10 |
| CMIMO support | no |
| Site to site distance | 500 meters |
| Channel | (1) International Telecommunications Union (ITU) Pedestrian (Ped) B, 3 kilometer per hour (km/h) (2) ITU Vehicle (Veh) A, 30 km/h (3) ITU VehB, 120 km/h |
| Max power in MS | 23 dBm |
| Antenna configuration | 1 × 2 single-input multiple output |
| HARQ | On (Max retrans: 4/Sync) |
| Target PER | 0.2 |
| Link to system mapping | Received bit mutual information rate |
| Scheduler type | Precoding flag |
| Resource assignment block | 8 LRU |
| Penetration loss | 20 dB |
| Control overhead | 0 for spectral efficiency (SE) calculation |

FIG. 4 is a graph 400 illustrating a comparison of throughput performance between a once-per-frame reporting period, represented by line 404, to a once-per-fifty frames reporting period, represented by line 408, in accordance with some embodiments. The graph 400 charts cell edge SE on the y-axis against sector SE on the x-axis. The cell edge SE may refer to the $5^{th}$ percentile point of a cumulative distribution function of users' average packet call throughput. The graph 400 corresponds to an ITU Ped B channel model in which the mobile station 104 is traveling at a rate of 3 km/h. The following table provides calculated values comparing the two reporting periods for the ITU Ped B channel model in accordance with some embodiments.

TABLE 2

| Gamma values | Sector SE (Mbps) (once per frame) | Sector SE (Mbps) (once per 50 frames) | Cell edge SE (Kbps) (once per frame) | Cell edge SE (Kbps) (once per 50 frames) |
| --- | --- | --- | --- | --- |
| 0 | 2.7824 | 2.7954 | 249.8821 | 249.1918 |
| 0.2 | 3.2997 | 3.2786 | 249.8087 | 247.5561 |
| 0.4 | 3.8532 | 3.8988 | 245.7588 | 248.3841 |
| 0.6 | 4.2585 | 4.283 | 243.6457 | 243.4676 |
| 0.8 | 4.6863 | 4.6295 | 199.1611 | 222.9262 |
| 1.0 | 4.8625 | 4.8119 | 147.1439 | 174.8764 |

FIG. 5 is a graph 500 illustrating a comparison of throughput performance between a once-per-frame reporting period, represented by line 504, to a once-per-fifty frames reporting period, represented by line 508, in accordance with some embodiments. The graph 500 charts cell edge SE on the y-axis against sector SE on the x-axis. The graph 500 corresponds to an ITU Veh A channel model in which the mobile station 108 is traveling at a rate of 30 km/h. The following table provides calculated values comparing the two reporting periods for the ITU Veh A channel model, with the mobile station 108 traveling at 30 km/h, in accordance with some embodiments.

TABLE 3

| Gamma values | Sector SE (Mbps) (once per frame) | Sector SE (Mbps) (once per 50 frames) | Cell edge SE (Kbps) (once per frame) | Cell edge SE (Kbps) (once per 50 frames) |
| --- | --- | --- | --- | --- |
| 0 | 2.2394 | 2.2704 | 188.4764 | 188.2928 |
| 0.2 | 2.6571 | 2.6781 | 188.4911 | 189.3502 |
| 0.4 | 3.0587 | 3.063 | 188.0101 | 188.2928 |
| 0.6 | 3.4483 | 3.376 | 185.9411 | 184.3934 |
| 0.8 | 3.6974 | 3.666 | 165.0619 | 158.0673 |
| 1.0 | 3.9941 | 3.9063 | 125.848 | 126.6814 |

FIG. 6 is a graph 600 illustrating a comparison of throughput performance between a once-per-frame reporting period, represented by line 604, to a once-per-fifty frames reporting period, represented by line 608, in accordance with some embodiments. The graph 600 charts cell edge SE on the y-axis against sector SE on the x-axis. The graph 600 corresponds to an ITU Veh B channel model in which the mobile station 108 is traveling at a rate of 120 km/h. The following table provides calculated values comparing the two reporting periods for the ITU Veh B channel model, with the mobile station 108 traveling at 120 km/h, in accordance with some embodiments.

TABLE 4

| Gamma values | Sector SE (Mbps) (once per frame) | Sector SE (Mbps) (once per 50 frames) | Cell edge SE (Kbps) (once per frame) | Cell edge SE (Kbps) (once per 50 frames) |
| --- | --- | --- | --- | --- |
| 0 | 2.3991 | 2.4287 | 204.1656 | 207.1067 |
| 0.2 | 2.8096 | 2.7971 | 207.8924 | 206.7982 |
| 0.4 | 3.2318 | 3.2573 | 204.9367 | 205.7628 |
| 0.6 | 3.5332 | 3.5562 | 195.5224 | 202.8309 |
| 0.8 | 3.8307 | 3.8378 | 160.6668 | 164.423 |
| 1.0 | 4.1024 | 4.0329 | 124.1406 | 136.6153 |

As can be seen by FIGS. 4-6 and Tables 2-4, the throughput performance between the once-per-frame and the once-per-fifty frames reporting periods are substantially similar. Accordingly, the base station 104 may be able to report the IoT information with a frequency that is significantly less than once per frame without incurring significant throughput losses.

Figure 7:
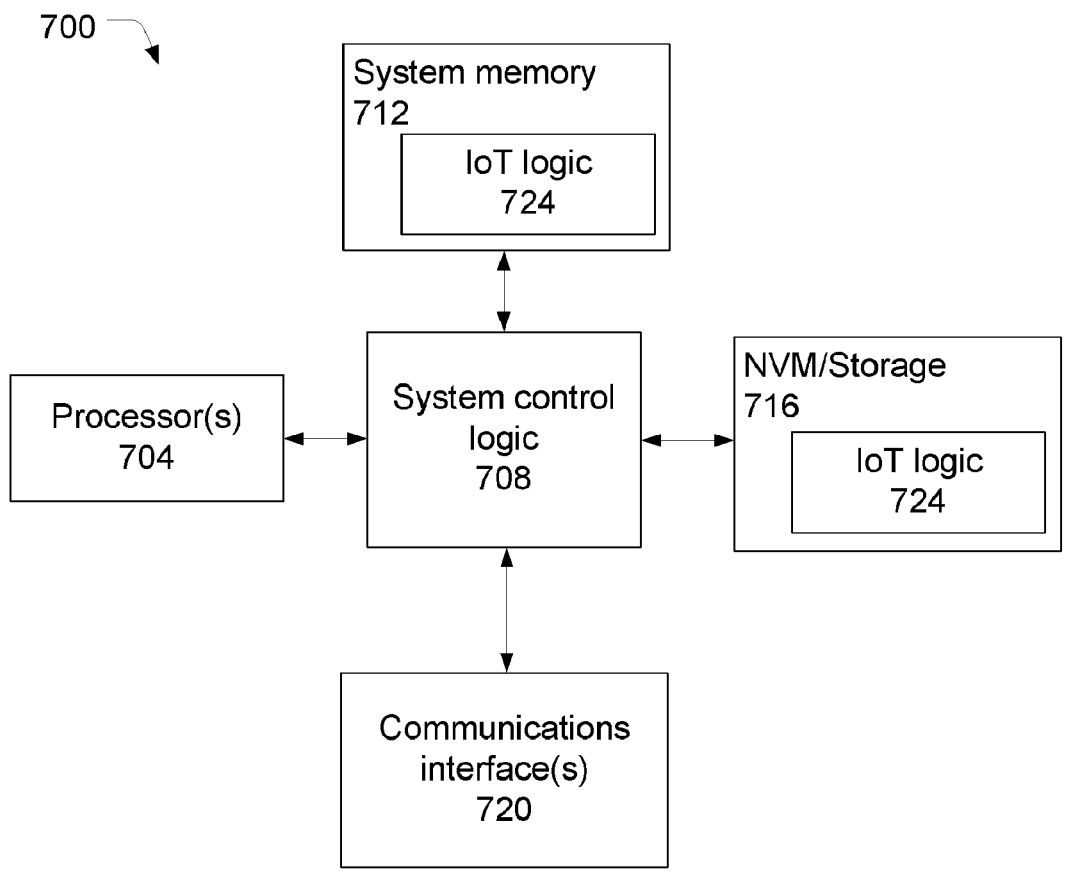
FIG. 7 illustrates an example system computing device capable of implementing a communications device in accordance with some embodiments.

The communication devices described herein may be implemented into a system using any suitable hardware and/or software to configure as desired. FIG. 7 illustrates, for one embodiment, an example system 700 comprising one or more processor(s) 704, system control logic 708 coupled to at least one of the processor(s) 704, system memory 712 coupled to system control logic 708, non-volatile memory (NVM)/storage 716 coupled to system control logic 708, and one or more communications interface(s) 720 coupled to system control logic 708.

System control logic 708 for one embodiment may include any suitable interface controllers to provide for any suitable interface to at least one of the processor(s) 704 and/or to any suitable device or component in communication with system control logic 708.

System control logic 708 for one embodiment may include one or more memory controller(s) to provide an interface to system memory 712. System memory 712 may be used to load and store data and/or instructions, for example, for system 700. System memory 712 for one embodiment may include any suitable volatile memory, such as suitable dynamic random access memory (DRAM), for example.

System control logic 708 for one embodiment may include one or more input/output (I/O) controller(s) to provide an interface to NVM/storage 716 and communications interface(s) 720.

NVM/storage 716 may be used to store data and/or instructions, for example. NVM/storage 716 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s) for example.

The NVM/storage 716 may include a storage resource physically part of a device on which the system 700 is installed or it may be accessible by, but not necessarily a part of, the device. For example, the NVM/storage 716 may be accessed over a network via the communications interface(s) 720.

System memory 712 and NVM/storage 716 may include, in particular, temporal and persistent copies of IoT logic 724, respectively. The IoT logic 724 may include instructions that when executed by at least one of the processor(s) 704 result in the system 700 performing IoT operations as described in conjunction with either the TPC module 144 or the IoT calculator 164 described herein. In some embodiments, the IoT logic 724 may additionally/alternatively be located in the system control logic 708.

Communications interface(s) 720 may provide an interface for system 700 to communicate over one or more network(s) and/or with any other suitable device. Communications interface(s) 720 may include any suitable hardware and/or firmware. Communications interface(s) 720 for one embodiment may include, for example, a network adapter, a wireless network adapter, a telephone modem, and/or a wireless modem. For wireless communications, communications interface(s) 720 for one embodiment may use one or more antennae.

For one embodiment, at least one of the processor(s) 704 may be packaged together with logic for one or more controller(s) of system control logic 708. For one embodiment, at least one of the processor(s) 704 may be packaged together with logic for one or more controllers of system control logic 708 to form a System in Package (SiP). For one embodiment, at least one of the processor(s) 704 may be integrated on the same die with logic for one or more controller(s) of system control logic 708. For one embodiment, at least one of the processor(s) 704 may be integrated on the same die with logic for one or more controller(s) of system control logic 708 to form a System on Chip (SoC).

In various embodiments, system 700 may have more or less components, and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A mobile station comprising:
a receiver configured to receive, from a base station, a first message via an over-the-air (OTA) interface, the first message to convey an interference over thermal (IoT) value;
a transmitter configured to transmit a second message via the OTA interface; and
a transmit power control (TPC) module coupled with the receiver and the transmitter, the TPC module configured to determine a noise and interference (NI) power level based on the IoT value and on a subcarrier spacing in a transmission region associated with the IoT value, to determine a transmit power level based on the NI power level, and to control the transmitter to transmit the second message at the transmit power level, wherein the IoT value is a first IoT value and the first message is to further convey a second IoT value, wherein the first IoT value is associated with a frequency partition and the second IoT value is associated with another frequency partition or another transmission region,
wherein the first message is a downlink message from a base station to the mobile station and the second message is an uplink message to the base station from the mobile station.

2. The mobile station of claim 1, wherein the first message comprises an IoT field having one or more bits to represent the IoT value as an integer between 0 and 127, with the IoT value corresponding to an IoT power level between 0 decibels (dB) and 63.5 dB.

3. The mobile station of claim 2, wherein the IoT field includes seven bits that represent the IoT value.

4. The mobile station of claim 1, wherein the first message is a media access control (MAC) control message.

5. The mobile station of claim 4, wherein the first message is a broadcast MAC control message.

6. The mobile station of claim 1, wherein the IoT value is associated with one of a plurality of transmission regions.

7. The mobile station of claim 1, wherein the first message further conveys a type value and the TPC module is further configured to determine a transmission region to which the IoT value is associated based on the type value.

8. The mobile station of claim 1, wherein the TPC module is configured to determine the NI power level by:

$$NI = P_N + IoT + 10\log_{10}(\Delta f),$$

where NI is the NI power level, $P_N$ is a thermal noise power density in 0° Celsius, IoT is an IoT power level that corresponds to the IoT value, and $\Delta f$ is a subcarrier spacing.

9. A method comprising:
receiving, by a mobile station, a broadcast message from a base station, the broadcast message including interference over thermal (IoT) information for a transmission region;
determining, by the mobile station, a noise and interference power level based on the IoT information and on a subcarrier spacing in the transmission region associated with the IoT information;
providing, by the mobile station, an uplink power control signal to a transmitter of the mobile station based on the determined noise and interference power level;
receiving another broadcast message from the base station, the another broadcast message including other IoT information for another transmission region;
determining another noise and interference power level based on the other IoT information and on another subcarrier spacing in the another transmission region associated with the other IoT information; and
providing another uplink power control signal to the transmitter based on the determined another noise and interference power level.

10. The method of claim 9, wherein said receiving the broadcast message comprises receiving a broadcast media access control (MAC) control message.

11. The method of claim 9, wherein said receiving the broadcast message including the IoT information comprises receiving a broadcast message including a seven-bit value that corresponds to an IoT power level between 0 decibels (dB) and 63.5 dB.

12. The method of claim 9, wherein said receiving the broadcast message including IoT information comprises receiving a broadcast message including a first number of bits to represent an IoT value and a second number of bits to represent a type value indicative of a transmission region to which the IoT value is associated.

13. The method of claim 12, wherein said receiving the broadcast message including the first number of bits to represent the IoT value and the second number of bits to represent the type value comprises receiving a broadcast message including seven bits that represent the IoT value and three bits that represent the type value.

14. An article of manufacture comprising:
a computer readable storage medium; and
instructions stored in the storage medium and configured to be executed by a processor of a mobile station to enable the mobile station to perform a method comprising:
receiving a broadcast message from a base station, the broadcast message including interference over thermal (IoT) information for a transmission region;
determining a noise and interference power level based on the IoT information and on a subcarrier spacing in the transmission region associated with the IoT information;
providing an uplink power control signal to a transmitter of the mobile station based on the determined noise and interference power level;
receiving another broadcast message from the base station, the another broadcast message including other IoT information for another transmission region;
determining another noise and interference power level based on the other IoT information and on another subcarrier spacing in the another transmission region associated with the other IoT information; and
providing another uplink power control signal to the transmitter based on the determined another noise and interference power level.

15. The mobile station of claim 1, wherein the TPC module is configured to determine the transmit power level in an open-loop manner independent of control by the base station.

* * * * *